United States Patent
Nilsson et al.

(10) Patent No.: US 11,849,403 B2
(45) Date of Patent: *Dec. 19, 2023

(54) TRANSMISSION OF UPLINK REFERENCE SIGNALS

(71) Applicant: Telefonaktiebolaget LM Ericsson (publ), Stockholm (SE)

(72) Inventors: Andreas Nilsson, Gothenburg (SE); Sebastian Faxér, Järfälla (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

This patent is subject to a terminal disclaimer.

(21) Appl. No.: 17/524,425

(22) Filed: Nov. 11, 2021

(65) Prior Publication Data

US 2022/0070790 A1 Mar. 3, 2022

Related U.S. Application Data

(63) Continuation of application No. 16/085,761, filed as application No. PCT/EP2018/061632 on May 4, 2018, now Pat. No. 11,184,859.

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0051* (2013.01); *H04W 52/325* (2013.01);
(Continued)

(58) Field of Classification Search
CPC . H04W 52/146; H04W 52/325; H04W 52/34; H04W 52/367; H04W 52/42;
(Continued)

(56) References Cited

U.S. PATENT DOCUMENTS

| | | | |
|---|---|---|---|
| 10,547,426 B2 | 1/2020 | Papasakellariou | |
| 2010/0029292 A1* | 2/2010 | Wan | H04W 72/542 |
| | | | 455/452.2 |

(Continued)

FOREIGN PATENT DOCUMENTS

| | | | | |
|---|---|---|---|---|
| CN | 105934893 A | * | 9/2016 | ............. H04B 7/005 |
| JP | 2009-060662 A | | 3/2009 | |

(Continued)

OTHER PUBLICATIONS

Michal Simko, "Implementation Aspects of Channel Estimation for 3GPP LTE Terminals", European Wireless 2011, Apr. 27-29, 2011. p. 1-27. (Year: 2011).*

(Continued)

*Primary Examiner* — Ayaz R Sheikh
*Assistant Examiner* — Louis Samara
(74) *Attorney, Agent, or Firm* — Rothwell, Figg, Ernst & Manbeck, P.C.

(57) ABSTRACT

There is provided mechanisms for transmitting uplink reference signals. A method is performed by a terminal device. The method comprises obtaining, from a network node, a configuration of transmission of the uplink reference signals. The configuration comprises an indication of a first frequency interval in which the uplink reference signals are to be transmitted. The method comprises distributing transmission power available for transmitting the uplink reference signals over the first frequency interval based on channel information for the first frequency interval. The method comprises transmitting the uplink reference signals in accordance with the distributed transmission power.

22 Claims, 7 Drawing Sheets

(51) Int. Cl.
*H04W 52/32* (2009.01)
*H04W 52/34* (2009.01)
*H04W 52/36* (2009.01)
*H04W 52/42* (2009.01)

(52) U.S. Cl.
CPC ......... *H04W 52/34* (2013.01); *H04W 52/367* (2013.01); *H04W 52/42* (2013.01)

(58) Field of Classification Search
CPC ..... H04W 72/542; H04L 5/0051; H04J 11/00; H04B 7/0656
See application file for complete search history.

(56) References Cited

U.S. PATENT DOCUMENTS

| | | | | |
|---|---|---|---|---|
| 2011/0098054 | A1* | 4/2011 | Gorokhov | H04B 7/024 455/422.1 |
| 2012/0287880 | A1* | 11/2012 | Frederiksen | H04L 1/0065 370/329 |
| 2013/0017859 | A1* | 1/2013 | Yamamoto | H04W 52/346 455/522 |
| 2013/0322280 | A1 | 12/2013 | Pi | |
| 2015/0341093 | A1* | 11/2015 | Ji | H04J 11/00 375/267 |
| 2018/0041261 | A1* | 2/2018 | Modarres Razavi | H04B 7/0656 |
| 2018/0102824 | A1* | 4/2018 | Jitsukawa | H04L 25/0204 |
| 2018/0278396 | A1* | 9/2018 | Yang | H04W 72/0446 |
| 2018/0309554 | A1* | 10/2018 | Moosavi | H04L 25/0202 |
| 2019/0069295 | A1* | 2/2019 | Ahn | H04B 7/0621 |
| 2020/0154442 | A1* | 5/2020 | Zhou | H04W 72/1215 |
| 2020/0169368 | A1* | 5/2020 | Tiirola | H04L 5/0053 |

FOREIGN PATENT DOCUMENTS

| | | |
|---|---|---|
| JP | 2019513326 A | 5/2019 |
| RU | 2 620 586 | 5/2017 |
| WO | 2017/034445 | 3/2017 |
| WO | WO-2017034445 A1 * | 3/2017 ......... H04L 25/0202 |
| WO | 2017/160052 A2 | 9/2017 |

OTHER PUBLICATIONS

Sony, "Considerations on SRS design", 3GPP TSG RAN WG1 NR Ad-Hoc#2, R1-1710855, Qingdao, China, Jun. 2017 (3 pages).
Ericsson, "Remaining issues on SRS", 3GPP TSG RAN WG1 Meeting #92, R1-1802756, Athens, Greece, Feb. 2018 (4 pages).
InterDigital, Inc., "Remaining issues on beam management", 3GPP TSG RAN WG1 Meeting #91, R1-1720630, Reno, USA, Nov. 2017 (13 pages).
International Search Report and Written Opinion dated Jan. 3, 2019 issued in International Application No. PCT/EP2018/061632. (17 pages).
Michal Simko, "Implementation Aspects of Channel Estimation for 3GPP LTE Terminals", European Wireless 2011, Apr. 27-29, 2011, (Year: 2011) (pp. 1-27).

\* cited by examiner

TRANSMISSION OF UPLINK REFERENCE SIGNALS

CROSS-REFERENCE TO RELATED APPLICATIONS

This application is a continuation of U.S. application Ser. No. 16/085,761, filed on Sep. 17, 2018 (now U.S. Pat. No. 11,184,859, issued on Nov. 23, 2021), which is a 35 U.S.C. § 371 National Stage of International Patent Application No. PCT/EP2018/061632, filed May 4, 2018. The above identified applications are incorporated by this reference.

TECHNICAL FIELD

Embodiments presented herein relate to a method, a terminal device, a computer program, and a computer program product for transmitting uplink reference signals. Embodiments presented herein further relate to a method, a network node, a computer program, and a computer program product for initiating transmission of uplink reference signals.

BACKGROUND

In communications networks, there may be a challenge to obtain good performance and capacity for a given communications protocol, its parameters and the physical environment in which the communications network is deployed.

Some communications networks are deployed for time-division duplexing (TDD). One benefit with TDD (compared to frequency-division duplexing; FDD) is that TDD enables reciprocity based beamforming, which can be applied both at the network-side (i.e. for downlink; DL) and the user-side (i.e. for uplink; UL). For reciprocity based DL transmission terminal devices at the user-side might transmit Sounding Reference Signals (SRSs) which a network node at the network-side might use to estimate the radio propagation channel between the network node and the terminal device. The channel estimate might then be used at the network node to find optimal precoding weights for coming DL transmission to the terminal device, for example by using so-call eigen-beamforming. The SRS should preferably span the full operational frequency bandwidth of the communication network to facilitate frequency selective precoding and/or frequency selective scheduling.

The system performance for reciprocity based DL beamforming might be limited by poor SRS coverage, which deteriorates the channel estimation quality. In communication networks utilizing comparatively high frequency bands (e.g. at millimeter wavelengths (mmW), i.e. near and above 30 GHz) the link budget for SRS could be comparatively high, partly due to the higher carrier frequency (where path loss is higher) and larger bandwidths (leading to less power spectral density; PSD) for the SRSs).

Different methods have been proposed improve the SRS link budget. One example is frequency hopping, which is illustrated in FIG. 1(a), where the SRSs are allocated different resource in frequency for different orthogonal frequency-division multiplexing (OFDM) symbols. For frequency hopping, different parts of the frequency band are sounded in different OFDM symbols, which means that the PSD will increase for the SRS. Another example is to repeat the same SRS over multiple OFDM symbols, as illustrated in FIG. 1(b), where the SRSs are allocated resource in the entire frequency interval for each OFDM symbol, which will increase the processing gain of the SRS as more and more OFDM symbols are decoded. Yet another example is that the network node notifies the terminal device to only transmit SRS on a certain part of the frequency band, which will increase the PSD of the SRS.

SRS transmission might be applied for DL reciprocity based operations, such that the radio propagation channel in the DL direction can be estimated frequently. If the SRS transmission is periodic, it commonly configured using high layer signaling (such as radio resource control; RRC) and could therefore not be updated very quickly, for example in order to track fast fading. However, it might be possible for the network node to adapt the SRS transmission to a more robust scheme, as for example the ones illustrated in FIGS. 1(a) and 1(b), to combat long term channel properties, for example high path loss.

One drawback with the two methods illustrated in FIG. 1 is that is that multiple OFDM symbols are needed for the SRS transmission. This will increase overhead and latency.

Further, decreasing the sounding bandwidth of the SRS leads to that the network node will only have channel estimations for a fraction of the frequency band. If the radio propagation channel is frequency selective it is possible that the sounded frequency band belongs to the comparatively bad parts of the frequency band, which will decrease the link budget for the SRS as well as the DL performance.

Hence, there is still a need for mechanisms enabling improved channel estimation.

SUMMARY

An object of embodiments herein is to enable improved channel estimation by means of efficient transmission of uplink reference signals.

According to a first aspect there is presented a method for transmitting uplink reference signals. The method is performed by a terminal device. The method comprises obtaining, from a network node, a configuration of transmission of the uplink reference signals. The configuration comprises an indication of a first frequency interval in which the uplink reference signals are to be transmitted. The method comprises distributing transmission power available for transmitting the uplink reference signals over the first frequency interval based on channel information for the first frequency interval. The method comprises transmitting the uplink reference signals in accordance with the distributed transmission power.

According to a second aspect there is presented a terminal device for transmitting uplink reference signals. The terminal device comprises processing circuitry. The processing circuitry is configured to cause the terminal device to obtain, from a network node, a configuration of transmission of the uplink reference signals. The configuration comprises an indication of a first frequency interval in which the uplink reference signals are to be transmitted. The processing circuitry is configured to cause the terminal device to distribute transmission power available for transmitting the uplink reference signals over the first frequency interval based on channel information for the first frequency interval. The processing circuitry is configured to cause the terminal device to transmit the uplink reference signals in accordance with the distributed transmission power.

According to a third aspect there is presented a terminal device for transmitting uplink reference signals. The terminal device comprises an obtain module configured to obtain, from a network node, a configuration of transmission of the uplink reference signals. The configuration comprises an indication of a first frequency interval in which the uplink reference signals are to be transmitted. The terminal device comprises a distribute module configured to distribute transmission power available for transmitting the uplink reference signals over the first frequency interval based on channel information for the first frequency interval. The terminal device comprises a transmit module configured to transmit the uplink reference signals in accordance with the distributed transmission power.

According to a fourth aspect there is presented a computer program for transmitting uplink reference signals, the computer program comprising computer program code which, when run on processing circuitry of a terminal device, causes the terminal device to perform a method according to the first aspect.

According to a fifth aspect there is presented a method for initiating transmission of uplink reference signals. The method is performed by a network node. The method comprises providing, to a terminal device, a configuration of transmission of the uplink reference signals from the terminal device. The configuration comprises an indication of a first frequency interval in which the uplink reference signals are to be transmitted. The method comprises receiving the uplink reference signals from the terminal device. The uplink reference signals have their transmission power distributed based on channel information for the first frequency interval.

According to a sixth aspect there is presented a network node for initiating transmission of uplink reference signals. The network node comprises processing circuitry. The processing circuitry is configured to cause the network node to provide, to a terminal device, a configuration of transmission of the uplink reference signals from the terminal device. The configuration comprises an indication of a first frequency interval in which the uplink reference signals are to be transmitted. The processing circuitry is configured to cause the network node to receive the uplink reference signals from the terminal device. The uplink reference signals have their transmission power distributed based on channel information for the first frequency interval.

According to a seventh aspect there is presented a network node for initiating transmission of uplink reference signals. The network node comprises a provide module configured to provide, to a terminal device, a configuration of transmission of the uplink reference signals from the terminal device. The configuration comprises an indication of a first frequency interval in which the uplink reference signals are to be transmitted. The network node comprises a receive module configured to receive the uplink reference signals from the terminal device. The uplink reference signals have their transmission power distributed based on channel information for the first frequency interval.

According to an eight aspect there is presented a computer program for initiating transmission of uplink reference signals, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these terminal devices, these network nodes, and these computer programs provide efficient enable improved channel estimation by means of efficient transmission of uplink reference signals.

Advantageously these methods, these terminal devices, these network nodes, and these computer programs enable overhead signalling to be reduced and latency to be reduced.

Allocating the uplink reference signals to time/frequency resources based on channel information improves the channel estimation of the uplink reference signal as well as the DL performance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The embodiments are now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
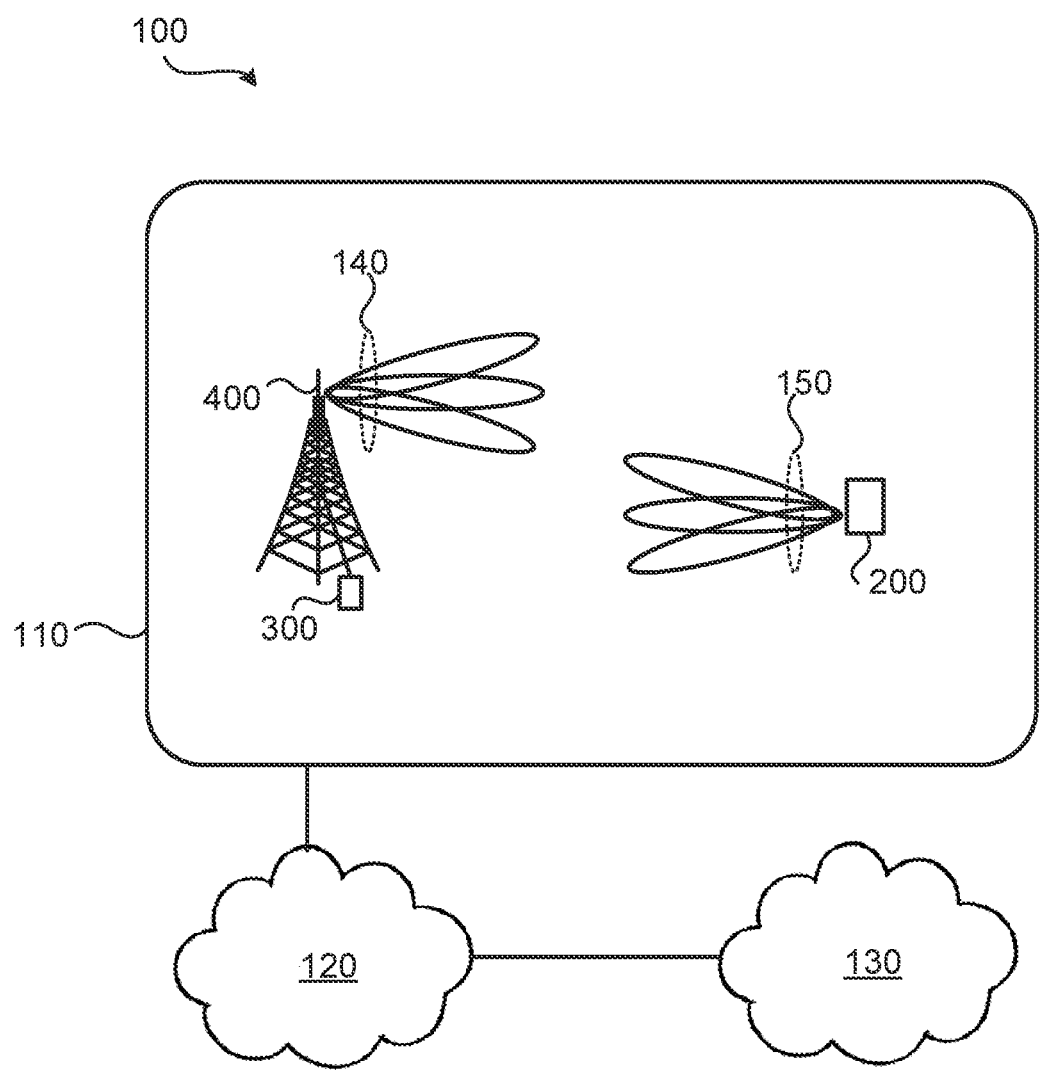
FIG. 2 is a schematic diagram illustrating a communication network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 300 configured to, via a transmission and reception point (TRP) 400, provide network access to at least one terminal device 200 in a radio access network 110. The radio access network 110 is operatively connected to a core network 120. The core network 120 is in turn operatively connected to a service network 130, such as the Internet. The terminal device 200 is thereby, via the TRP 400 and network node 300, enabled to access services of, and exchange data with, the service network 130.

Examples of network nodes 300 are radio access network nodes, radio base stations, base transceiver stations, Node Bs, evolved Node Bs, g Node Bs, access points, and access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 30 is, via the TRP 400, configured to communicate with the terminal device 200 in beams 140 and the terminal device 200 is configured to communicate with network node 300 in beams 150. Further, the network node 300 and the terminal device 200 could be configured to communicate with each other using a variety of beams having different shapes and widths, herein generally referred to as having different beam patterns.

As disclosed above, there is still a need for mechanisms enabling improved channel estimation. An object of embodiments herein is therefore to enable improved channel estimation by means of efficient transmission of uplink reference signals. In this respect, as the uplink link budget may be poor in certain scenarios and for some terminal devices 200, it might be beneficial for the terminal device 200 to concentrate the available transmission power for the uplink reference signals to a comparatively narrow frequency interval in order to increase the PSD and hence the received signal to interference plus noise ratio (SINR) of the uplink reference signals. This may, for example, be beneficial if the channel estimates derived from the uplink reference signals is used by the network node 300 to determine DL precoder weights for use with reciprocity-based DL beamforming, as this typically requires high-quality channel estimates. This may also be beneficial if the channel estimates derived from the uplink reference signals are used for UL link adaptation.

The embodiments disclosed herein thus relate to mechanisms for transmitting uplink reference signals and initiating transmission of uplink reference signals. In order to obtain such mechanisms there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 3:
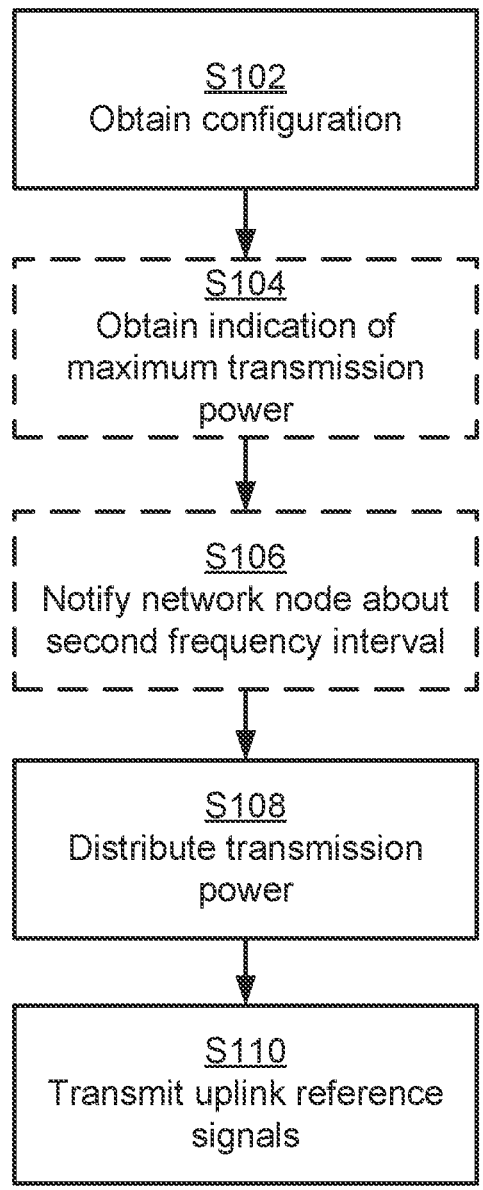
FIGS. 3 and 4 are flowcharts of methods according to embodiments.

Reference is now made to FIG. 3 illustrating a method for transmitting uplink reference signals as performed by the terminal device 200 according to an embodiment.

It is assumed that uplink reference signals are to be transmitted by the terminal device 200. The terminal device 200 is thus configured to perform step S102:

S102: The terminal device 200 obtains, from the network node 300, a configuration of transmission of the uplink reference signals. The configuration comprises an indication of a first frequency interval in which the uplink reference signals are to be transmitted.

For the transmission of the uplink reference signals (e.g. for DL reciprocity operations), the network node 300 allows the terminal device 200 to select (e.g. based on reciprocity from DL reference signals) how to distribute transmission power available for transmitting the uplink reference signals over the first frequency interval. Particularly, the terminal device 200 is configured to perform step S108:

S108: The terminal device 200 distributes transmission power available for transmitting the uplink reference signals over the first frequency interval based on channel information for the first frequency interval.

The terminal device 200 transmits the uplink reference signals. Particularly, the terminal device 200 is configured to perform step S110:

S110: The terminal device 200 transmits the uplink reference signals in accordance with the distributed transmission power.

Embodiments relating to further details of transmitting uplink reference signals as performed by the terminal device 200 will now be disclosed.

There may be different ways for the terminal device 200 to distribute the transmission power over the first frequency interval. Different embodiments relating thereto will now be described in turn.

In some aspects the first frequency interval comprises a single subband. In some aspects, in order for the terminal device 200 to determine how to distribute the part of first frequency interval, a wideband reference signal is first transmitted from the network node 300. Hence, according to an embodiment the terminal device 200 and the network node 300 communicate with each other in a communication system having an active system bandwidth, and the single subband spans the entire active system bandwidth. This enables the terminal device 200 to sound the entire active system bandwidth. In this respect the active system bandwidth can be configured per terminal device and does not need to span the whole bandwidth the network node 300 is configured to operate in. In some aspects the active system bandwidth corresponds to a bandwidth part (BWP). The BWP can be defined as a contiguous set of physical resource blocks, selected from a contiguous subset of the common resource blocks for a given numerology on a given carrier.

In other aspects the first frequency interval comprises at least two subbands. For example, the configuration might comprise an indication of a set of candidate subbands. The first frequency interval might thus be divided into the set of candidate subbands in which the uplink reference signals are allowed to be transmitted. That is, according to an embodiment, the first frequency interval comprises a set of candidate subbands and where the terminal device 300 distributes the transmission power over either one single subband or over more than one subband. Particularly, according to a first embodiment the transmission power is distributed only over one single subband. Likewise, according to a second embodiment the transmission power is distributed over less than one subband. Further, according to a second embodiment the transmission power is distributed over at least two of the at least two subbands.

In the latter case, there might be a restriction that the transmission power is only distributed over continuous subbands. Hence, according to an embodiment the at least two subbands are contiguous. Further, the at least two subbands might be non-overlapping and of the same size. For instance, the indication of the first frequency interval might comprise a starting PRB index $k_0$ and a number of contiguous subbands N, where each subband has a subband size M. In some examples, M is a multiple of the minimum SRS bandwidth granularity $M_{min}$ PRBs (where, for example, $M_{min}$=4), such that M=x·$M_{min}$ where x is an integer. According to another embodiment the at least two subbands are non-contiguous.

In some aspects there is a uniform distribution of the transmission power within the second frequency interval. That is, according to an embodiment the transmission power is uniformly distributed within the second frequency interval. However, in other aspects the transmission power might be distributed with an arbitrary power level in any subband. Hence, the transmission power might be distributed differently on different subbands. This allows the terminal device 200 to allocate a larger power spectral density to the subbands where the channel is strong, and hence be able to track the fast fading with the uplink reference signal transmission. Particularly, according to an embodiment the channel information is indicative of frequency parts with high channel quality and frequency parts with less than the high quality, and the transmission power is distributed within the first frequency interval such that more transmission power is allocated to those frequency parts with high channel quality than those frequency parts with less than the high quality.

In some aspects, the terminal device 200 obtains information of a maximum transmission power for the transmission of the uplink reference signals. Particularly, according to an embodiment the terminal device 200 is configured to perform (optional) step S104:

S104: The terminal device 200 obtains an indication of maximum transmission power to be used for transmitting the uplink reference signals. The distributed transmission power is then weighted according to the maximum transmission power.

When step S104 is performed, it is performed before step S108.

Further, in some aspects the possible power levels for a subband are constrained to zero, or $P_{max}$/L, where $P_{max}$ is the transmission power of the uplink reference signal and L is the number of selected subbands for the uplink reference signal transmission. Particularly, according to an embodiment the transmission power is distributed so as to be non-zero only for a set of frequency bands in the first frequency interval. The set of frequency bands might define a second frequency interval. The second frequency interval might be contiguous.

The uplink reference signals might be transmitted on sub-carriers. Then, the uplink reference signals might be transmitted using as many sub-carriers as fitting within the second frequency interval.

In some aspects, the terminal device 200 notifies the network node 300 about the second frequency interval in which the uplink reference signals are to be transmitted. Particularly, according to an embodiment the terminal device 200 is configured to perform (optional) step S106:

S106: The terminal device 200 notifies the network node 300 about the second frequency interval before transmitting the uplink reference signals.

When step S106 is performed, it is performed before step S108.

According to an embodiment the transmission power is distributed according to a function. As a non-limiting example, the mapping of the uplink reference signals, as defined by a sequence $r^{(p_i)}(k',l')$, to physical resources $a_{K_{TC}k'+k_0,l'+l_0}^{(p_i)}$ is described by the following expression, which follows the notation of Section 6.4.1.4.3 in document 3GPP TS 38.211:

$$a_{K_{TC}k'+k_0,l'+l_0}^{(p_i)} = \begin{cases} \frac{1}{\sqrt{N_{ap}}}\beta_{SRS}(\lfloor k'/M \rfloor)r^{(p_i)}(k',l') & k'=0,1,\ldots,M_{sc,b}^{RS}-1 \ l'=0,1,\ldots,N_{symb}^{SRS}-1 \\ 0 & \text{otherwise} \end{cases}.$$

In this expression $\beta_{SRS}$ (m) indicates a power scaling for subband m, M is the subband size, k' is the relative subcarrier index on the transmission comb, l' is the relative OFDM symbol index within the slot, $k_0$ is the frequency starting position of the SRS frequency-allocation, $l_0$ is the OFDM symbol starting position, $p_i$ is the SRS antenna port, $N_{ap}$ is the number of SRS antenna ports in the SRS resource, $M_{sc,b}^{RS}$ is the number of subcarriers in the frequency-allocation, and $K_{TC}$ is the transmission comb size.

As disclosed above, the transmission power is distributed based on channel information for the first frequency interval. The channel information generally pertain to properties of the radio propagation channel between the terminal device 200 and the network node 300. These properties are typically reciprocal between the terminal device 200 and the network node 300. There could be different ways for the terminal device 200 to obtain the channel information. According to a first embodiment the channel information is obtained from the network node 300. According to a second embodiment the channel information is estimated by the terminal device 200 itself. As an example, the terminal device 200 might estimate the channel information by performing measurements on downlink reference signals, such as on channel state information reference signals (CSI-RS). In some aspects the downlink reference signals, to base the estimate on, is defined via higher layer configuration and/or downlink control information (DCI). The downlink reference signals may for instance be cell specific, device specific or uplink reference signal specific. In other aspects, there is a default downlink reference signal which the terminal device 200 uses for this purpose.

The UL link budget, and thus an appropriate frequency interval, for the transmission of the uplink reference signals to reach a certain SINR target typically depends mostly on slow-fading channel properties, which may change rather slowly. Thus, the desired frequency interval allocated for the transmission of the uplink reference signals may be constant approximately the same for relatively longer periods of time. However, which part of the frequency band is the strongest for a certain radio propagation channel towards the terminal device 200 may be a faster changing channel fading property and change more rapidly. As it might be beneficial to concentrate the transmission power of the uplink reference signal where the radio propagation channel currently is strongest, it might be beneficial to change the frequency interval to which the uplink reference signal is allocated on a faster order than which the first frequency interval as such is changed.

By obtaining new channel information for the first frequency interval before each occurrence of the uplink reference signals are to be transmitted, the terminal device 200 can adapt the distribution of the transmission power over the first frequency interval to new channel information. In some aspects the distribution of transmission power over the first frequency interval therefore changes from different transmissions of the uplink reference signals. That is, according to an embodiment the uplink reference signals are transmitted at transmission occurrences, and the uplink reference signals as transmitted at two neighbouring transmission occurrences have mutually different distributions of transmission power.

There could be different ways to determine the transmission occurrences for the uplink reference signals. In some aspects the network node 300 instructs the terminal device 200 as when to transmit the uplink reference signals. Particularly, according to an embodiment the configuration as obtained in step S102 further comprises an indication for the terminal device 200 to transmit the uplink reference signals, and the uplink reference signals are then in step S110 transmitted in response thereto (i.e., in response to having obtained the indication in step S102).

There could be different types of uplink reference signals. According to one example the uplink reference signals are sounding reference signals (SRS). The SRS to use might then be selected from a set of SRS resources configured by the network node 300. Transmission of the SRS in accordance with the distributed transmission power might then be triggered by the network node 300. Thereby, when the terminal device 200 is triggered to transmit a certain SRS, the terminal device 200 knows that the SRS can be transmitted with its transmission power distributed based on channel information for the first frequency interval. Further, a certain downlink reference signal can be associated with the SRS, or set of SRS, such that the terminal device 200 knows which downlink reference signal to measure on in order for the terminal device 200 to estimate the channel information.

Figure 4:
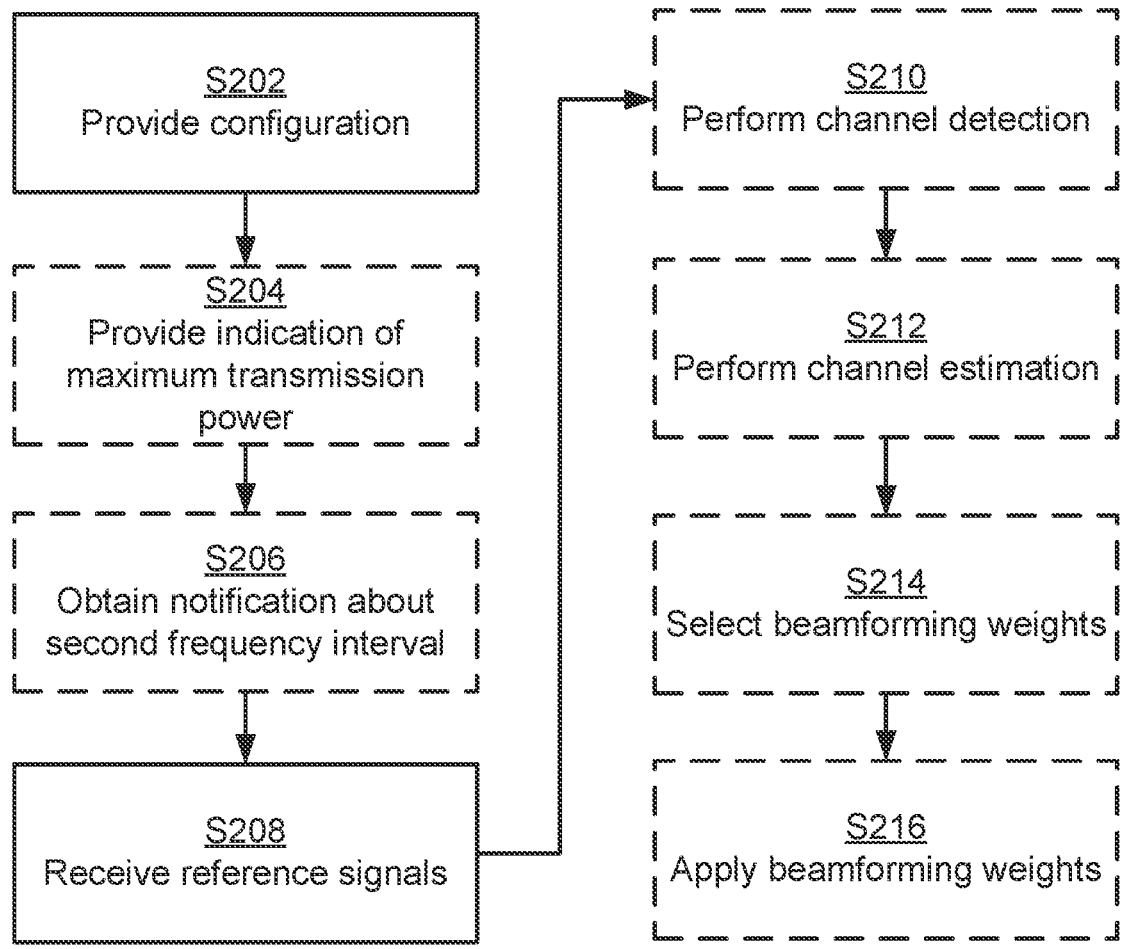

Reference is now made to FIG. 4 illustrating a method for initiating transmission of uplink reference signals as performed by the network node 300 according to an embodiment.

As disclosed above, the terminal device 200 in step S102 obtains configuration of transmission of the uplink reference signals. The network node 300 is therefore configured to perform step S202:

S202: The network node 300 provides, to the terminal device 200, a configuration of transmission of the uplink reference signals from the terminal device 200. The configuration comprising an indication of a first frequency interval in which the uplink reference signals are to be transmitted.

As disclosed above, the terminal device 200 in step S110 transmits the uplink reference signals. The uplink reference signals are assumed to be received by the network node 300. Hence, the network node 300 is configured to perform step S208:

S208: The network node 300 receives the uplink reference signals from the terminal device 200. The uplink reference signals have their transmission power distributed based on channel information for the first frequency interval.

Embodiments relating to further details of initiating transmission of uplink reference signals as performed by the network node 300 will now be disclosed.

As disclosed above, in some aspects the terminal device 200 obtains information of a maximum transmission power for the transmission of the uplink reference signals. Therefore, according to an embodiment the network node 300 is configured to perform (optional) step S204:

S204: The network node 300 provides, to the terminal device 200, an indication of maximum transmission power to be used for transmitting the uplink reference signals.

In this respect, different control loops can be used to define how much transmission power the terminal device 200 is to use. For open loop transmission power control the network node 300 might signal parameter values that the terminal device 200 uses for determining the transmission power. For closed loop transmission power control the network node 300 might instruct the terminal device 200 to increase or decrease the transmission power.

When step S204 is performed, it is performed before step S208.

As further disclosed above, in some aspects the transmission power only is distributed so as to be non-zero within a second frequency interval. There might then be different ways for network node 300 to determine second frequency interval.

According to some aspects, as disclosed above, the terminal device 200 might notify the network node 300 about the second frequency interval in which the uplink reference signals are to be transmitted. Thus, according to an embodiment the network node 300 is configured to perform (optional) step S206:

S206: The network node 300 obtains a notification from the terminal device 200 about the second frequency interval before receiving the uplink reference signals.

When step S206 is performed, it is performed before step S208.

According to other aspects, the network node 300 executes a detection algorithm in order to detect which part of the first frequency interval that was selected by the terminal device 200. Particularly, according to an embodiment the network node 300 is configured to perform (optional) step S210.

S210: The network node 300 performs channel detection in order to determine the second frequency interval.

When step S210 is performed, it is performed after step S208.

The channel detection might involve the network node 300 to measure power, such as reference signal received power (RSRP), in the first frequency interval (such as for different subbands) in order to determine the second frequency interval in which the uplink reference signals were transmitted. The channel detection might, additionally or alternatively, involve the network node 300 to calculate the channel estimation error for different parts of the first frequency interval, such as for the different subbands.

There could be different ways for the network node 300 to act once having received the uplink reference signals in step S208.

In some aspects the network node 300 utilizes the received uplink reference signals for channel estimation purposes. Particularly, according to an embodiment the network node 300 is configured to perform (optional) step S212:

S212: The network node 300 performs channel estimation based on the received uplink reference signals.

In some aspects the network node 300 utilizes the channel estimation when performing downlink beamforming towards the terminal device 200 Particularly, according to an embodiment the network node 300 is configured to perform (optional) steps S214 and S216:

S214: The network node 300 selects beamforming weights based on the channel estimation.

The beamforming weights might be DL precoder weights.

S216: The network node 300 applies the beamforming weights during downlink transmission towards the terminal device 200.

Figure 5:
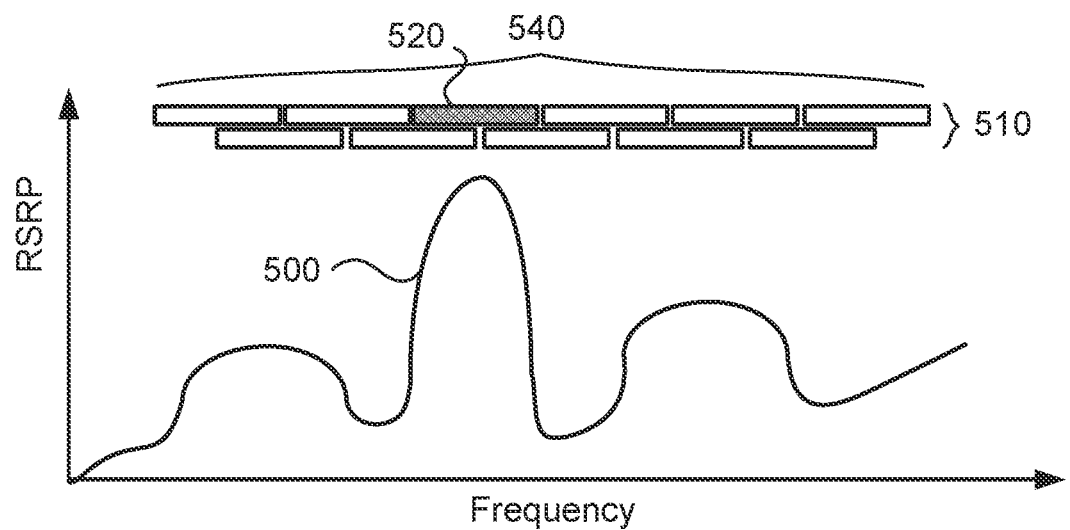
FIGS. 5 and 6 are schematic illustrations of distribution of transmission power to subbands for transmission of uplink reference signals according to embodiments.

FIG. 5 schematically illustrates a first set of channel conditions 500 in terms of RSRP as a function of frequency. In the illustrative example of FIG. 5, the terminal device 200 is to distribute the transmission power of the uplink reference signal by selecting one subband 520 in a set of eleven subbands 510. The set of subbands 510 covers a first frequency interval 540. The selected subband 520 is the one where the channel conditions 500 has highest RSRP. In this example the terminal device 200 thus selects one whole subband 520 from a set of predetermined candidate subbands 510. By using predetermined candidate subbands 510, the detection at the network node 300 of which part of the first frequency interval 540 that the terminal device 200 has selected for the transmission of the uplink reference signals becomes easier.

Figure 6:
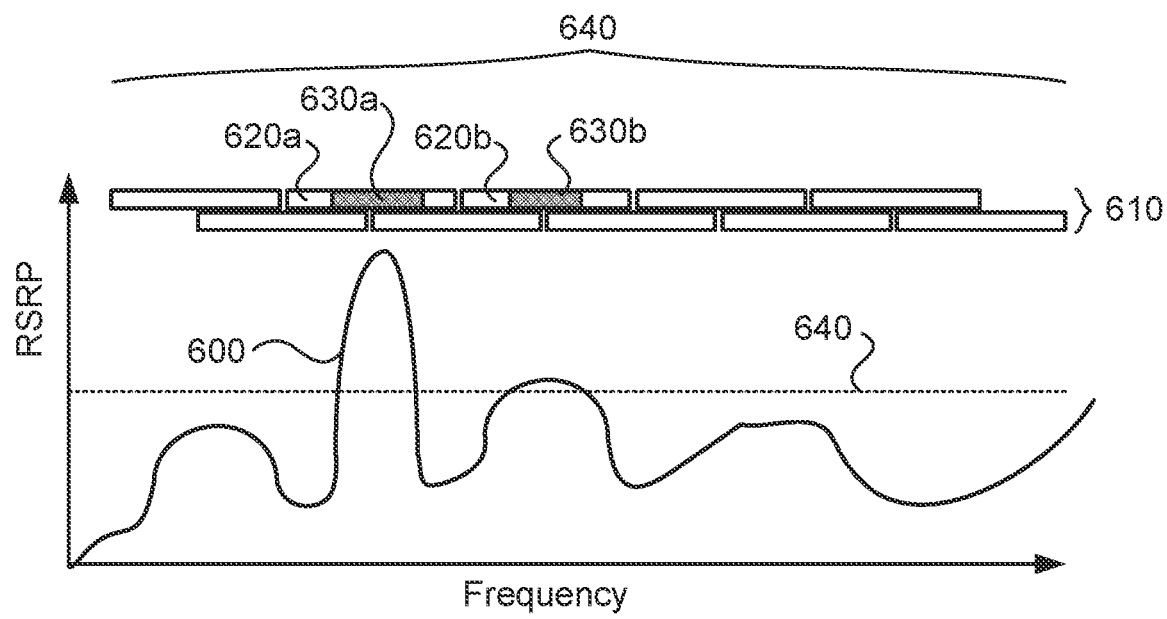

FIG. 6 schematically illustrates a second set of channel conditions 600 in terms of RSRP as a function of frequency. In the illustrative example of FIG. 6, the terminal device 200 is to distribute the transmission power of the uplink reference signal only in parts 630a, 630b of those subbands 620a, 620b in a set of ten subbands 610 where the channel conditions 500 has RSRP values above a threshold RSRP value 640. The set of subbands 610 covers a first frequency interval 640. Further, in this example the part 630a is allocated more transmission power than the part 630b since the RSRP for the part 630a is higher than for the part 630b. In this example the actual selected frequency interval in which the uplink reference signals are to be transmitted thus comprises two parts 630a, 630b, where each part 630a, 630b is shorter, in terms of frequency, than one whole subband 620a, 620b. In this way, the network node 300 could, for example, calculate an average RSRP and/or average channel estimation error for each candidate subband 610, and if the RSRP is above a certain threshold and/or the channel estimation error is below a certain threshold for one or more subbands 620a, 620b the network node 300 can assume that the part, or parts, 630a, 630b in which the uplink reference signal is transmitted, are within this one or more subbands 620a, 620b.

Figure 7:
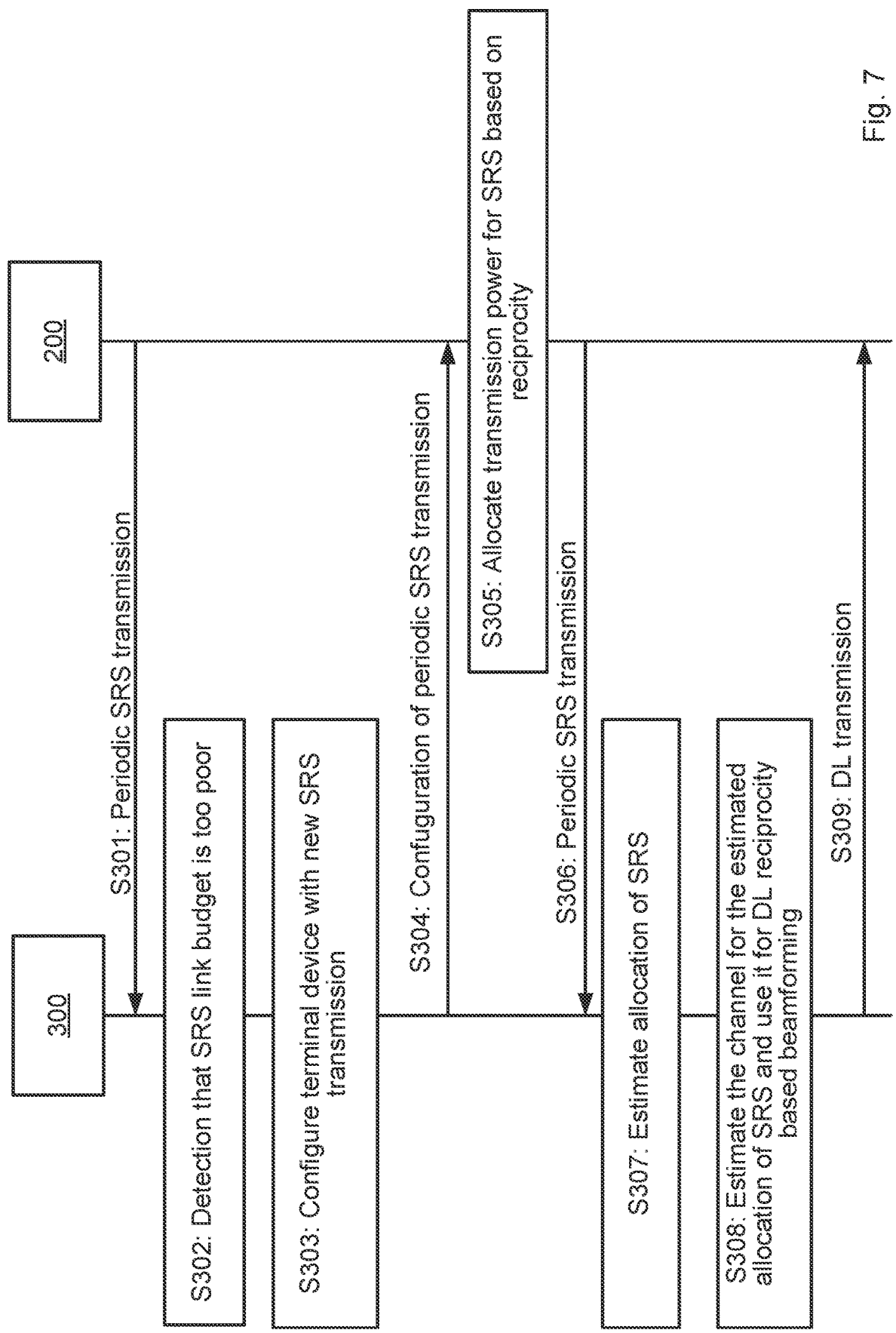
FIG. 7 is a signalling diagram according to an embodiment.

One particular embodiment for transmitting uplink reference signals, and for initiating the same, based on at least some of the above disclosed embodiments will now be disclosed in detail with reference to the signalling diagram of FIG. 7.

Figure 1:
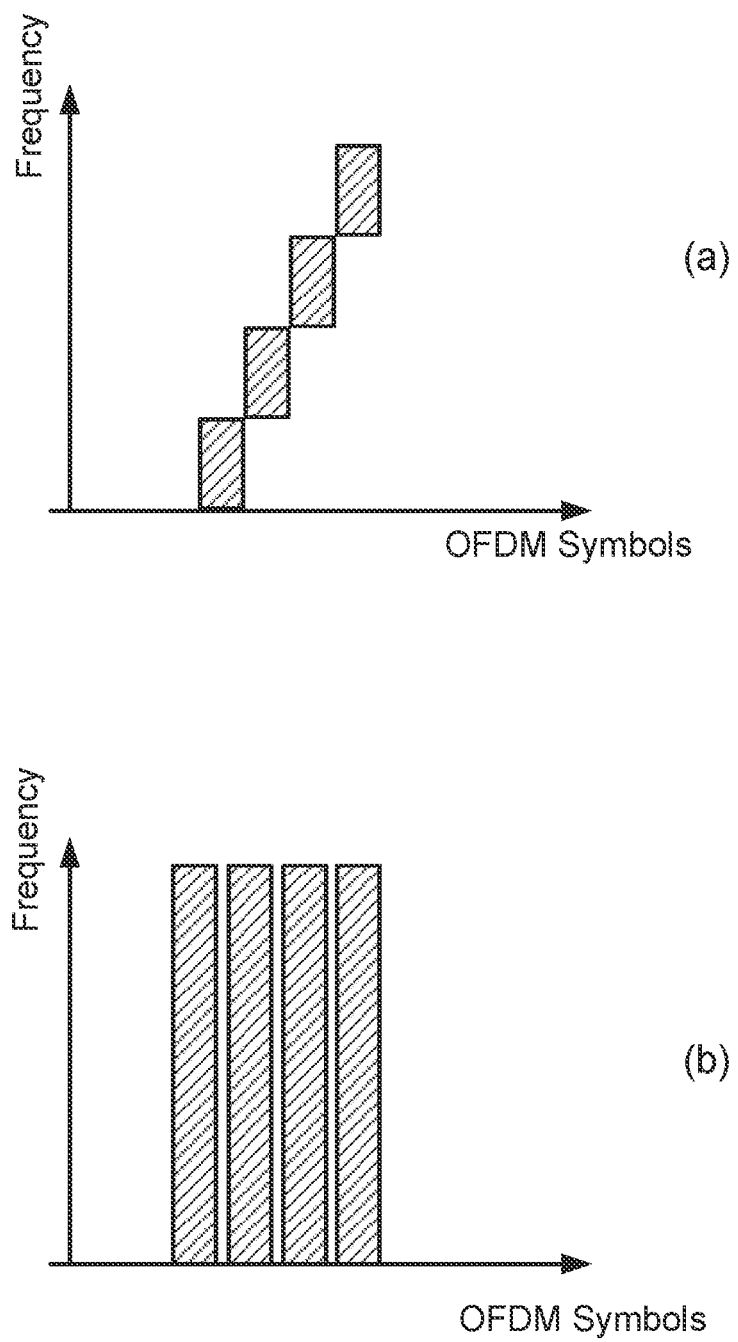
FIG. 1 shows schematic illustrations of how to allocate resources for transmission of SRS.
Figure 1:

S301: The terminal device 200 transmits SRS towards the network node 300 according to a default configuration where the SRS covers the entire active system bandwidth, for example such that in FIG. 1(*a*) or 1(*b*).

S302: The network node 300 detects that the SRS link budget is too poor (by for example analyzing channel estimation error) to properly be used for reciprocity based DL beamforming.

S303: The network node 300 configures the terminal device 200 with a new SRS transmission, where the terminal device 200 is allowed to determine (e.g. based on reciprocity from DL reference signals) how to distribute the transmission power of the SRS over a first frequency interval.

S304: The network node 300 provides the configuration of transmission of the SRS to the terminal device 200. One way to implement step S304 is to perform step S102 and step S202.

S305: The terminal device 200 distributes transmission power available for transmitting the SRS over the first frequency interval based on channel information for the first frequency interval. One way to implement step S305 is to perform step S108.

S306: The terminal device 200 transmits the SRS in accordance with the distributed transmission power. One way to implement step S306 is to perform step and step S110 and step S208.

S307: The network node 300 performs channel detection in order to determine how the transmission power is distributed over the first frequency interval in order to estimate the location of the SRS. One way to implement step S307 is to perform step S210.

S308: The network node 300 performs channel estimation based on the received SRS and selects beamforming weights for reciprocity based DL beamforming based on the channel estimation. One way to implement step S308 is to perform step S212 and step S214.

S309: The network node 300 performs DL transmission towards the terminal device 200 whilst applying the beamforming weights. One way to implement step S309 is to perform step S216.

Figure 8:
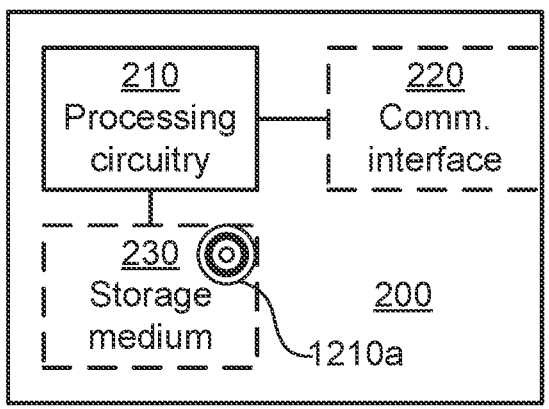
FIG. 8 is a schematic diagram showing functional units of a terminal device according to an embodiment.

FIG. 8 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, S102-S110, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with other entities, nodes, functions, and devices of the communication network 100. As such the communications interface 220 may comprise one or more transmitters and receivers, comprising analogue and digital components.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 9:
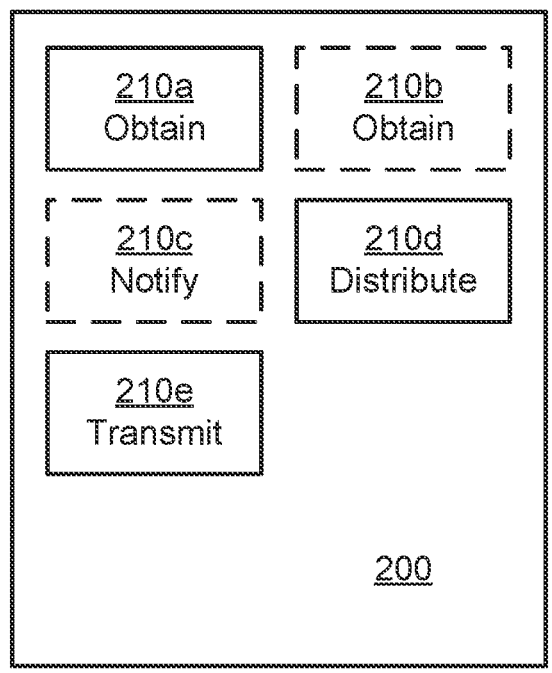
FIG. 9 is a schematic diagram showing functional modules of a terminal device according to an embodiment.

FIG. 9 schematically illustrates, in terms of a number of functional modules, the components of a terminal device 200 according to an embodiment. The terminal device 200 of FIG. 9 comprises a number of functional modules; an obtain module 210a configured to perform step S102, a distribute module 210d configured to perform step S108, and a transmit module 210e configured to perform step S110. The terminal device 200 of FIG. 9 may further comprise a number of optional functional modules, such as any of an obtain module 210b configured to perform step S104, and a notify module 210C configured to perform step S106. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the terminal device 200 as disclosed herein.

Figure 10:
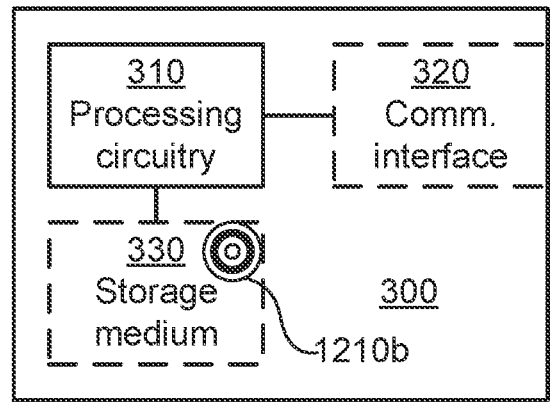
FIG. 10 is a schematic diagram showing functional units of a network node according to an embodiment.

FIG. 10 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S216, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, nodes, functions, and devices of the communication network 100. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 11:
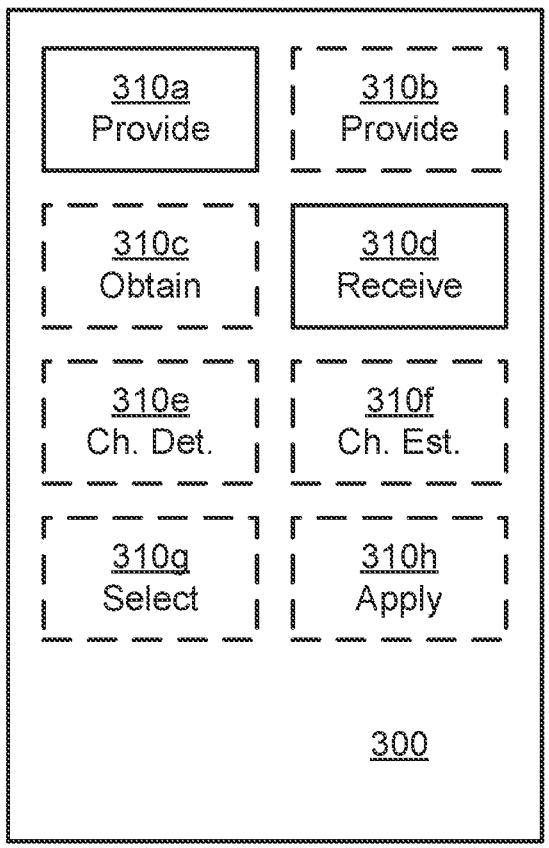
FIG. 11 is a schematic diagram showing functional modules of a network node according to an embodiment.

FIG. 11 schematically illustrates, in terms of a number of functional modules, the components of a network node 300 according to an embodiment. The network node 300 of FIG. 11 comprises a number of functional modules; a provide module 310a configured to perform step S202 and a receive module 310d configured to perform step S108. The network node 300 of FIG. 11 may further comprise a number of optional functional modules, such as any of a provide module 310b configured to perform step S204, an obtain module 310c configured to perform step S206, a channel detection module 310e configured to perform step S210, a channel estimation module 310f configured to perform step S212, a select module 310g configured to perform step S214, an apply module 310h configured to perform step S216.

In general terms, each functional module 310a-310h may be implemented in hardware or in software. Preferably, one or more or all functional modules 310a-310h may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310h and to execute these instructions, thereby performing any steps of the network node 300 as disclosed herein.

The network node 300 may be provided as a standalone device or as a part of at least one further device. For example, the network node 300 may be provided in a node of the radio access network 110 (as in the illustrative example of FIG. 2) or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the TRP 400 than instructions that are not required to be performed in real time.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 10 the processing circuitry 310 may be distributed among a plurality of devices, or nodes. The same applies to the functional modules 310a-310h of FIG. 11 and the computer program 1220b of FIG. 12.

Figure 12:
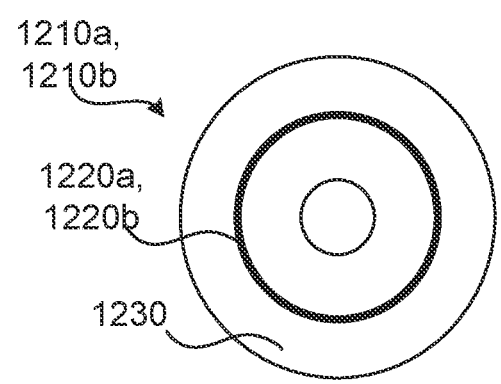
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the terminal device 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the network node 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A terminal device, the terminal device comprising:
a transmitter;
a receiver for receiving reference signal configuration information comprising an indication of a first frequency interval in which a set of one or more uplink reference signals is to be transmitted; and
processing circuitry being configured to cause the terminal device to:
distribute transmission power available for transmitting the uplink reference signal(s) over the first frequency interval based on channel information for the first frequency interval; and
transmit the uplink reference signal(s) in accordance with the distributed transmission power, wherein
the first frequency interval comprises a first part and a second part,
the terminal device is configured to distribute the transmission power by performing a process that comprises: i) determining a first transmission power for the first part of the first frequency interval and ii) determining a second transmission power for the second part of the first frequency interval, wherein the first transmission power is different than the second transmission power, and
the terminal device is configured to transmit the uplink reference signal(s) in accordance with the distributed transmission power by performing a process that comprises: i) using the first transmission power to transmit a first uplink reference signal in the first part of the first frequency interval and ii) if the second transmission power is non-zero, using the second transmission power to transmit the first uplink reference signal, or a second uplink reference signal, in the second part of the first frequency interval.

2. The terminal device of claim 1, wherein
the first frequency interval comprises at least two subbands,
the at least two subbands are contiguous, and
the transmission power is distributed over at least two of the at least two subbands.

3. The terminal device of claim 1, wherein
the first frequency interval comprises at least two subbands, and
the transmission power is distributed only over one single subband.

4. The terminal device of claim 1, wherein
the first frequency interval comprises a single subband,
the terminal device and a network node communicate with each other in a communication system having an active system bandwidth, and
the single subband spans the entire active system bandwidth.

5. The terminal device of claim 1, wherein
the first frequency interval comprises at least two subbands, and
the transmission power is distributed over less than one subband.

6. The terminal device of claim 1, wherein the terminal device is further configured to select a particular set of frequency bands in the first frequency interval, wherein
the transmission power is distributed so as to be non-zero only for the particular set of frequency bands in the first frequency interval selected by the terminal device.

7. The terminal device of claim 6, wherein the particular set of frequency bands in the first frequency interval is contiguous.

8. The terminal device of claim 6, wherein the terminal device is further configured such that, before transmitting the uplink reference signal(s), the terminal device transmits a message comprising information identifying the particular set of frequency bands in the first frequency interval.

9. The terminal device of claim 8, wherein the uplink reference signal(s) are transmitted using as many subcarriers as fitting within the particular set of frequency bands in the first frequency interval.

10. The terminal device of claim 1, wherein
the terminal device is further configured to obtain an indication of maximum transmission power to be used for transmitting the uplink reference signal(s), and
the distributed transmission power is weighted according to the maximum transmission power.

11. The terminal device of claim 1, wherein the channel information is indicative of frequency parts with high channel quality and frequency parts with less than the high quality, and wherein the transmission power is distributed within the first frequency interval such that more transmission power is allocated to those frequency parts with high channel quality than those frequency parts with less than the high quality.

12. The terminal device of claim 1, wherein
the uplink reference signal(s) are transmitted at transmission occurrences, and
the uplink reference signal(s) are transmitted at two neighbouring transmission occurrences have mutually different distributions of transmission power.

13. The terminal device of claim 1, wherein
the uplink reference signal(s) comprise a sounding reference signal (SRS), and
the SRS is selected from a set of SRS resources, and
transmission of the SRS in accordance with the distributed transmission power is triggered by a network node.

14. The terminal device of claim 1, wherein the terminal device is further configured to:
obtain a first channel condition value that is associated with the first part of the first frequency interval; and
obtain a second channel condition value that is associated with the second part of the first frequency interval, wherein
the terminal device is configured to determine the first transmission power based on the first channel condition value, and
the terminal device is configured to determine the second transmission power based on the second channel condition value.

15. The terminal device of claim 14, wherein the terminal device is configured to determine the first transmission power based on the first channel condition value by performing a process that includes comparing the first channel condition value to a threshold channel condition value.

16. The terminal device of claim 1, wherein
the first frequency interval comprises a set of two or more frequency subbands, and
the terminal device is further configured to:
select a subset of the set of frequency subbands for the transmission of the uplink reference signal(s); and
prior to transmitting the uplink reference signal(s), transmit a message to a network node, the message indicating the subset of the set of frequency subbands that the terminal device has selected for the transmission of the uplink reference signal(s).

17. The terminal device of claim 16, wherein the terminal device is configured to select the subset of the set of frequency subbands for the transmission of the uplink reference signal(s) by selecting only a single frequency subband from the set of frequency subbands.

18. A network node, the network node comprising:
a transmitter;
a receiver; and
processing circuitry, the processing circuitry being configured to cause the network node to:
employ the transmitter to transmit to a terminal device a configuration for a transmission of one or more uplink reference signals, the configuration comprising an indication of a first frequency interval in which the uplink reference signal(s) are to be transmitted; and
employ the receiver to receive the uplink reference signal(s) transmitted by the terminal device, wherein
the first frequency interval comprises a set of two or more frequency subbands, and
the network node is further configure to, prior to receiving the uplink reference signal(s), employ the receiver to receive a message transmitted by the terminal device, the message indicating a subset of the set of frequency subbands that the terminal device has selected for the transmission of the uplink reference signal(s).

19. The network node of claim 18, wherein the network node is further configured to provide, to the terminal device, an indication of maximum transmission power to be used for transmitting the uplink reference signal(s).

20. The network node of claim 18, wherein the transmission power is distributed so as to be non-zero only for frequency subbands included in the indicated subset of the frequency subbands.

21. The network node of claim 18, wherein the network node is further configured to:
perform channel estimation based on the received uplink reference signal(s);
select beamforming weights based on the channel estimation; and
apply the beamforming weights during downlink transmission towards the terminal device.

22. The network node of claim 18, wherein the transmission power of the uplink reference signal(s) are distributed based on channel information for the first frequency interval.

* * * * *